(12) United States Patent
Klein et al.

(10) Patent No.: US 8,447,970 B2
(45) Date of Patent: May 21, 2013

(54) SECURING OUT-OF-BAND MESSAGES

(75) Inventors: Johannes Klein, Sammamish, WA (US);
Aurelio Navarro Belletti Garcia, Braga (PT); Ernesto Miranda Pedrosa da Silva, Braga (PT); Rafael Alberto Marques Torres, Barcelos (PT); William Qian, Seattle, WA (US); Eduard Ostrovsky, Kirkland, WA (US); Oliver Bruno Colbert, Seattle, WA (US); Ganapathy Raman, Redmond, WA (US); Edgar Pereira Alves, Braga (PT)

(73) Assignee: Microsoft Corporation, Redmond, WA (US)

(*) Notice: Subject to any disclaimer, the term of this patent is extended or adjusted under 35 U.S.C. 154(b) by 617 days.

(21) Appl. No.: 12/702,632

(22) Filed: Feb. 9, 2010

(65) Prior Publication Data

US 2011/0197059 A1    Aug. 11, 2011

(51) Int. Cl.
*H04L 29/06* (2006.01)
(52) U.S. Cl.
USPC ............ 713/155; 726/5; 726/21; 380/259
(58) Field of Classification Search
None
See application file for complete search history.

(56) References Cited

U.S. PATENT DOCUMENTS

| | | | |
|---|---|---|---|
| 6,732,150 B1 * | 5/2004 | Thrane | 709/206 |
| 7,114,083 B2 | 9/2006 | Devine et al. | |
| 7,178,025 B2 | 2/2007 | Scheidt et al. | |
| 7,194,621 B1 | 3/2007 | Nguyen et al. | |
| 7,370,209 B2 | 5/2008 | Gaither et al. | |
| 8,060,916 B2 * | 11/2011 | Bajaj et al. | 726/3 |
| 2003/0182559 A1 * | 9/2003 | Curry et al. | 713/189 |
| 2006/0251256 A1 * | 11/2006 | Asokan et al. | 380/270 |
| 2007/0022469 A1 | 1/2007 | Cooper et al. | |
| 2009/0210707 A1 | 8/2009 | De Lutiis et al. | |
| 2009/0220080 A1 | 9/2009 | Herne et al. | |

FOREIGN PATENT DOCUMENTS

| | | | |
|---|---|---|---|
| JP | 02009111488 A | * | 5/2009 |
| WO | 2009082717 A2 | | 7/2009 |

OTHER PUBLICATIONS

Smith, Joel, " How to Enable TLS Within Out of Band Management 7.0 after the Install ", Retrieved at <21 http://www.symantec.com/connect/articles/how-enable-tls-within-out-band-management-70-after-install>>, May 13, 2009, pp. 4.

* cited by examiner

*Primary Examiner* — Kaveh Abrishamkar

(57) ABSTRACT

Securing an out-of-band message from a server to a mobile computing device. After requesting a service ticket from a trusted third party (e.g., via a pre-existing ticketing infrastructure), the requested service ticket and a shared secret are obtained from the trusted third party via a first channel. The mobile computing device thereafter sends the service ticket with the shared secret to a server via a second channel. The server encrypts a message (e.g., an SMS message) using the shared secret. The mobile computing device receives the encrypted message from the server via a third channel that is out-of-band relative to the first channel. The encrypted message is decrypted via the shared secret and the decrypted message is provided to a user of the mobile computing device. In some embodiments, the message includes commands for controlling the mobile computing device.

20 Claims, 4 Drawing Sheets

SECURING OUT-OF-BAND MESSAGES

BACKGROUND

Short message service (SMS) is a communications protocol that allows an interchange of short text messages between mobile computing devices. SMS text messaging has become one of the most widely used tools of communications in many business and personal situations having billions of active users sending and receiving text messages on their mobile computing devices. However, due at least to the increasing availability of eavesdropping equipment for cellular communications, SMS messages are becoming more vulnerable to eavesdropping, spoofing, and other malicious attacks. As a result, securing SMS communication against eavesdropping, interception, and modification by other parties is of increasing concern to users.

SUMMARY

Embodiments of the disclosure secure an out-of-band message sent from a server to a client. Upon a request from a client for a service ticket, a trusted third party provides the client with a shared secret including a service ticket. Thereafter, the client sends the service ticket with the shared secret to a server. The server encrypts a message with the shared secret and sends the encrypted message to the client. The client decrypts the encrypted message using the shared secret to obtain the message from the server.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

Corresponding reference characters indicate corresponding parts throughout the drawings.

DETAILED DESCRIPTION

Figure 1:
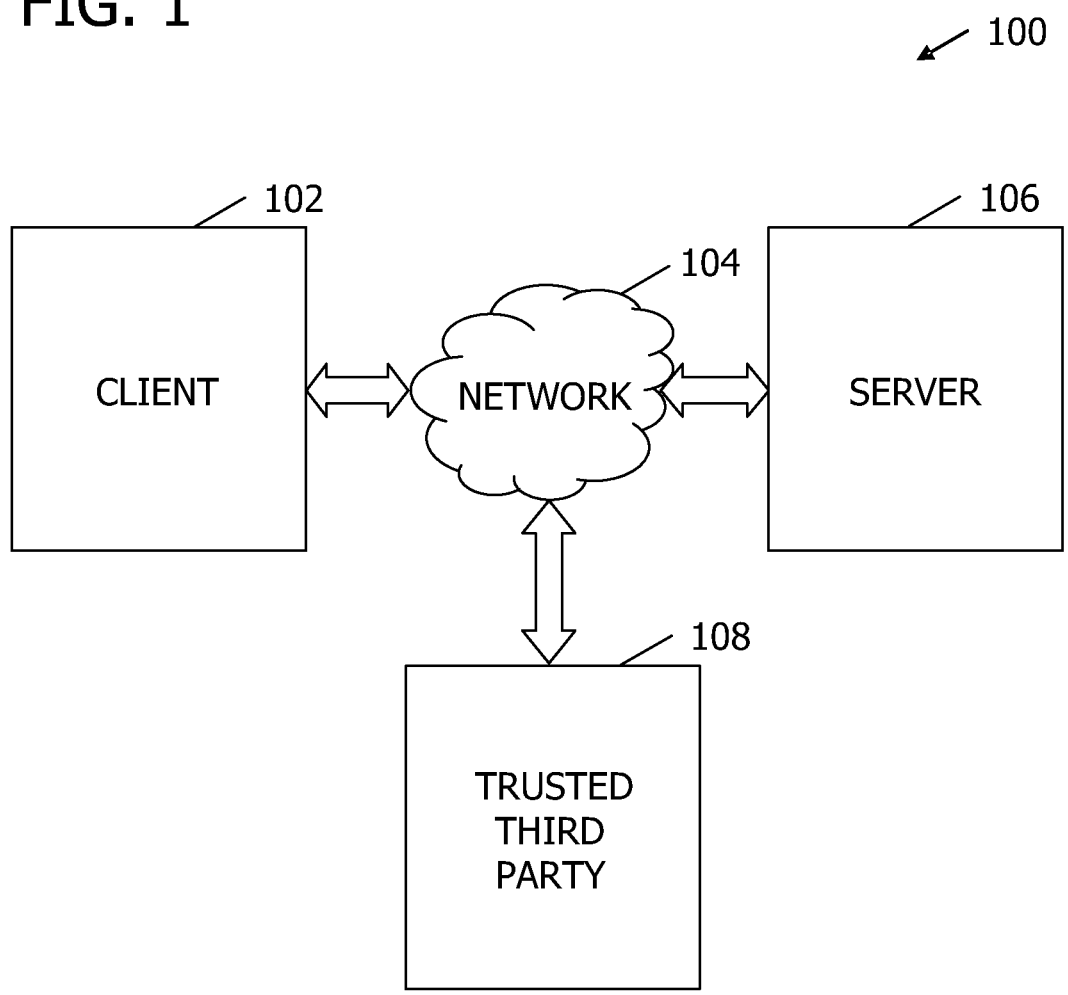
FIG. 1 is an exemplary block diagram illustrating a trusted third party providing a service ticket and a shared secret to a mobile computing device.

Referring to the figures and in particular to system 100 shown in FIG. 1, embodiments of the disclosure enable a trusted third party 108 to maintain control of a shared secret that is used by a server 106 and a client 102 to encrypt and decrypt messages (e.g., short message service (SMS) messages, multimedia messaging service (MMS) messages, or similar telecommunications messaging services) sent between the server 106 and the client 102 via an out-of-band channel. The encrypted message may be used to control a mobile computing device (e.g., mobile computing device 202). For example, the encrypted message may reboot, install/update software, lock the mobile computing device, unlock the mobile computing device, activate certain features associated with the mobile computing device, enable/disable features associated with the mobile computing device, and the like. The present disclosure enables the client 102 to send a request for a service ticket to a trusted third party 108 via a first channel. For example, the request for the service ticket occurs using a pre-existing ticketing infrastructure. Upon sending the request, the trusted third party 108 provides the client 102 with a service ticket including a shared secret associated with the requested service ticket. Thereafter, the client 102 sends the service ticket with the shared secret to the server 106 via a second channel. Utilizing the shared secret provided to the server 106 by the client 102, the server 106 encrypts and sends an SMS message to the client 102 via a third channel. The third channel is an out-of-band channel relative to the first channel and to the second channel. For example, the third channel represents a different communication mode or protocol. Utilizing the shared secret provided to the client 102 by the trusted third party 108, the client 102 decrypts the encrypted SMS message.

By using the shared secret, messages containing instructions for controlling the mobile computing devices are secured. For example, aspects of the disclosure prevent a malicious third party from sending instructions, commands or software elements to the mobile computing device (e.g. undesired parameter changes, personal information retrieving, virus code downloading to name a few).

Referring again to FIG. 1, the client 102 is connected to the server 106 and the trusted third party 108 via a network 104. Although system 100 has particular application to wireless networks, other channels of communication between the client 102, the server 106, and the trusted third party 108 are possible. As an example, the server 106 may communicate with the client 102 through local area networks, or direct communication such as land-based lines or wireless telephone connections. Thus, while FIG. 1 illustrates communication via the network 104, it is for illustrative purposes only and not intended to be a limitation on the present disclosure. In one embodiment, a wireless link between the client 102 and the network 104 may contain one or more different channels, such as one or more in-band channels (e.g., first and second channels) and one or more out-of-band channels (e.g., third channels). The system 100 may also include a short message service center that can provide SMS messages to and from the server 106 and the client 102. In some embodiments, the server 106 is a peer computing device and the client 102 (e.g., a mobile computing device) and the peer computing device are in a peer-to-peer relationship.

In some embodiments, the trusted third party 108 is part of a pre-existing ticketing infrastructure. In such an infrastructure, the trusted third party 108 stores, has access to, or generates one or more shared secrets that correspond to certain actions and/or information to be exchanged between the client 102 and the server 106. Further, the trusted third party 108 stores, has access to, or generates one or more service tickets that are to be sent to the client 102 upon a request from the client 102 for one of the service tickets. As will be described in further detail below, a service ticket with a shared secret is sent to the client 102 simultaneously upon a request from the client 102 for a service ticket, which is thereafter used to encrypt and decrypt messages sent from the server 106 via an out-of-band channel. Each of the client 102 and the server 106 form an agreement to use the trusted third party 108, and in turn, the trusted third party 108 provides for processing of the requests for the shared secret stored by, or accessible by, the trusted third party 108.

Figure 2:
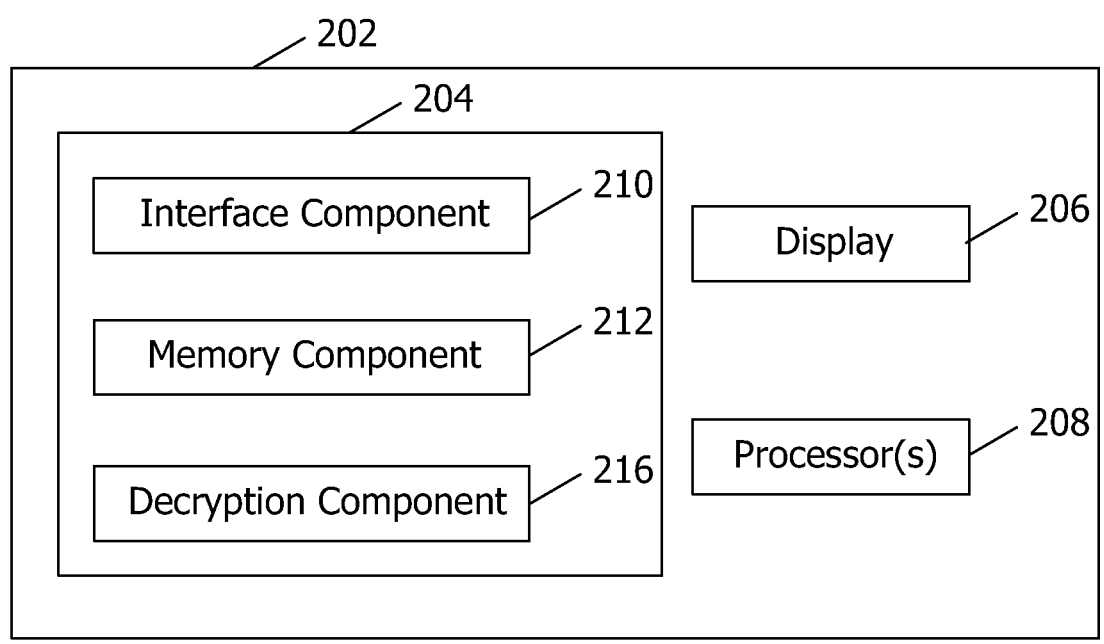
FIG. 2 is an exemplary block diagram of a mobile computing device having a memory area storing components for verifying an authenticity of short message service (SMS) messages sent from a server.

Referring next to FIG. 2, an exemplary block diagram illustrates a mobile computing device 202 (such as the client 102) having a memory area 204, at least one processor 208, and a display 206. The display 206 may be, for example, a display device separate from the mobile computing device 202, a display integrated into the mobile computing device 202 (e.g., such as in a mobile telephone), a capacitive touch screen display, or a non-capacitive display. User input functionality may also be provided in the display 206, where the display 206 acts as a user input selection device such as in a touch screen.

While embodiments of the disclosure are illustrated and described herein with reference to the mobile computing device 202, aspects of the disclosure are operable with any device that performs the functionality illustrated and described herein, or its equivalent. For example, embodiments of the disclosure are operable with netbooks, desktop computing devices, laptop computers, portable gaming consoles and other computing devices.

In some embodiments, the memory area 204 further stores one or more computer-executable components. Exemplary components include, but are not limited to an interface component 210, a memory component 212, and a decryption component 216. While the components are shown to be stored in the memory area 204, the components may be stored and executed from a memory area remote from the mobile computing device 202. For example, the components may be stored by a cloud service, and the output of the execution of the components may be provided to the mobile computing device 202. Such embodiments reduce the computational and storage burden on the mobile computing device 202.

The interface component 210, when executed by the processor 208, causes the processor 208 to communicate with the server 106 and the trusted third party 108. For example, the interface component 210 requests a service ticket from the trusted third party 108. In one embodiment, the interface component 210 includes one or more user interfaces for receiving user input from a user via a keyboard, touch display, mouse, or other user input selection devices. Thus, the interface component 210 may receive direct user input that indicates what information/requests are sent to the server 106. After the request has been made, or in some embodiments simultaneously with the request, the interface component 210 receives, from the trusted third party 108 over a first channel (e.g., a TCP channel), the requested service ticket with a shared secret that corresponds to the requested service ticket. The interface component 210 further sends the service ticket with the shared secret to the server 106 over a second channel (e.g., another TCP channel).

The memory component 212, when executed by the processor 208, causes the processor 208 to store the shared secret in the memory area 204. In some embodiments, the shared secret (and service ticket) expires after a pre-defined amount of time and another shared secret is obtained, for example, with each subsequent service ticket request. The memory component 212 further stores an encrypted short messaging service (SMS) message received from the server 106 via a third channel (e.g., SMS service). The third channel is out-of-band relative to the first channel and to the second channel. For example, the encrypted message may contain security updates or an update of a specific application on the client 102.

The decryption component 216, when executed by the processor 208, causes the processor 208 to decrypt the encrypted SMS message via the shared secret. As explained in detail below, the embodiments of the present disclosure utilize a symmetric encryption key for encrypting and decrypting the messages (e.g., SMS messages). The symmetric encryption key may be created by either the server 106 or the client 102 by using the shared secret.

In embodiments, the processor 208 is transformed into a special purpose microprocessor by executing computer-executable instructions or by otherwise being programmed. For example, the processor 208 is programmed with instructions such as illustrated next in FIG. 3.

Figure 3:
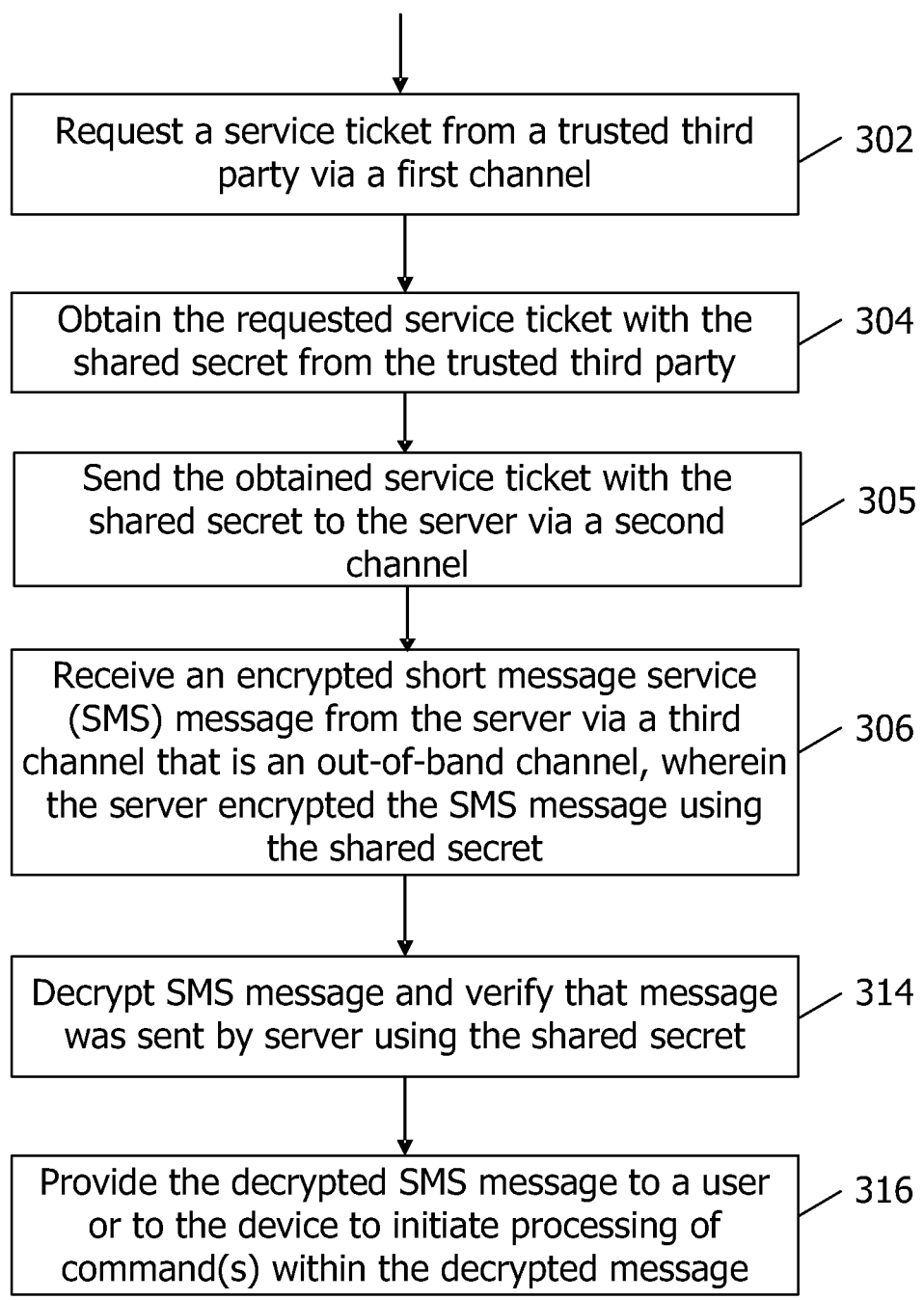
FIG. 3 is an exemplary flow chart illustrating a process for securing an SMS message via a shared secret.

Referring now to FIG. 3, an exemplary flow chart illustrates securing a message (e.g., an SMS message) from the server 106 to the client 102 (e.g., the mobile computing device 202) via an out-of-band channel. While described with reference to the mobile computing device 202 and the server 106, the operations illustrated in FIG. 3 are applicable to computing devices other than mobile computing devices and servers.

At 302, a service ticket is requested from the trusted third party 108 by the client 102 via a first channel (e.g., by the client 102 via a mobile computing device 202). For example, a user may log onto an application on the mobile computing device 202 or another computing device and request that a service ticket, which may or may not be encrypted, be sent to a service provider (e.g., the server 106). In some embodiments, the first channel is secured (e.g., secure sockets layer) and the mobile computing device 202 authenticates to the trusted third party 108 (e.g., provides a password).

In one embodiment, the request for the service ticket is made on an in-band channel (e.g., a first channel such as a TCP channel) to the trusted third party 108 that stores the requested service ticket. After requesting a service ticket, at 304, the mobile computing device 202 receives the requested service ticket with a shared secret that corresponds to the requested service ticket from the trusted third party 108. The service ticket with the shared secret is received via the first channel. In embodiments in which the mobile computing device 202 authenticates to the trusted third party 108 when requesting the service ticket, the service ticket may include an identifier of the mobile computing device 202 in the returned service ticket.

The mobile computing device 202 sends the obtained service ticket with the shared secret to the server 106. The service ticket may include therein an identifier of the mobile computing device 202. In some embodiments, the shared secret is automatically sent to the server 106 upon receipt by the mobile computing device 202 of the service ticket with the shared secret. In other embodiments, the mobile computing device 202 sends the service ticket with the shared secret to the server 106 at some time subsequent to the time of receipt of the service ticket by the mobile computing device 202. The mobile computing device 202 sends the obtained service ticket with the shared secret to the server 106 via a second channel (e.g., another TCP channel) at 305. In either example, the first channel and the second channel differ from a channel (e.g., a third channel) subsequently used to send messages from the server 106 to the mobile computing device 202.

At 306, an SMS message encrypted by the server 106 using the shared secret is sent from the server 106 to the mobile computing device 202. The encrypted messages may be solicited or unsolicited. The encrypted message is sent from the server 106 to the mobile computing device 202 via a channel that is considered out-of-band relative to the channel used to obtain the service ticket (e.g., out-of-band relative to the pre-existing ticketing infrastructure). For example, in embodiments in which the mobile computing device 202 sends the service ticket to the server 106 via the first channel (e.g., a TCP channel), the encrypted message is sent via a third channel (e.g., an SMS channel).

At 314, the encrypted message is decrypted by the mobile computing device 202 via the shared secret, and thereafter, at 316, the decrypted message is provided to a user of the mobile computing device 202. In some embodiments, the decrypted message is provided to a component (e.g., operating system, application program, etc.) on the mobile computing device 202 to initiate processing of the data within the decrypted message. For example, the data may include commands such as wipe, lock, unlock, install software, etc. for execution on the mobile computing device 202.

Communicating between the server 106 and the mobile computing device 202 via, for example, an SMS notification system presents a challenge in designing an SMS format since each sent SMS message directly affects operational costs. Accordingly, the SMS messages are encrypted and encoded to make efficient use of the 160-character limit in SMS messaging. As such, embodiments of the disclosure protect against attackers potentially reading the messages, altering the messages and resending the SMS messages.

The server 106 may encrypt the message via the shared secret in different ways. For example, the shared secret is used by the server 106 (or by an additional trusted party) to derive an encryption key for symmetric encryption algorithms, as both the mobile computing device 202 and the server 106 derive the encryption key from the shared secret. In some embodiments, the AES192 enhanced encryption algorithm can be used for encrypting. In this example, the encryption key is derived from a SHA256 hash of the shared secret prefixed with the word ENCRYPT using CryptDeriveKey from the advapi32.dll. The SMS message, for example, may use the HMACSHA256 hashing algorithm to compute a hash from the message components before encryption, which prevents attackers from altering the SMS message as the hash is verified before the operation proceeds. In this embodiment, the 128-bit key for the HMAC is derived from a SHA256 hash of the shared secret prefixed with the word HASH and derived using the RC4 encryption algorithm. The contents of the SMS message is Base64 encoded to convert it to a standard ASCII format for sending. In this embodiment, a plain text prefix is attached to the front of the SMS message so that an application of the mobile computing device 202 can differentiate between sent SMS messages.

A format of an exemplary encrypted SMS message is now explained with reference to Table 1 below. The following exemplary format of an encrypted SMS message avoids the use of separators between each message component as each separator occupies an entire character for itself. Each component is a fixed length of bytes which enables the client 102 (e.g., the mobile computing device 202) to safely assume which bytes represent which data. The structure of an encrypted SMS message is as follows, although other structures are contemplated:

SMS=[Prefix][EncodedData]

EncodedData=[SequenceNumber][EncryptedData]

EncryptedData=[Hash] [Version] [ActionCode] [RequestID] [TimeStamp] [Data]

Data=Defined by the type of action

Table 1 below describes each of the above elements.

TABLE 1

Description of Elements of Exemplary SMS Message Structure.

| Element | Size | Description |
| --- | --- | --- |
| Prefix | 4 Char | The prefix is a plain text identifier for the messages |
| Hash | 32 bytes | The hash is a HMACSHA256 computed hash of all the other elements (excluding the prefix) in their unencrypted state. The order of the elements is assumed to be: [SequenceNumber][Version][ActionCode][RequestID][TimeStamp][Data] |
| SequenceNumber | 1 byte | This is a number identifying which shared secret the mobile device 202 decrypts with |
| Version | 4 bits | Specifies the version of the message payload. Supports 16 version numbers |
| ActionCode | 4 bits | Enumerates which action to perform. Supports 16 actions. |
| RequestID | 4 bytes | This is a reference to the performing job in the database |
| TimeStamp | 4 bytes | The time the message was sent in seconds since 1/1/1980 0:0:0. Used to avoid replay attacks. |
| Data | Variable | Defined by the action, such as, Ring, Locate, Lock, Wipe, and the like |

Figure 4:
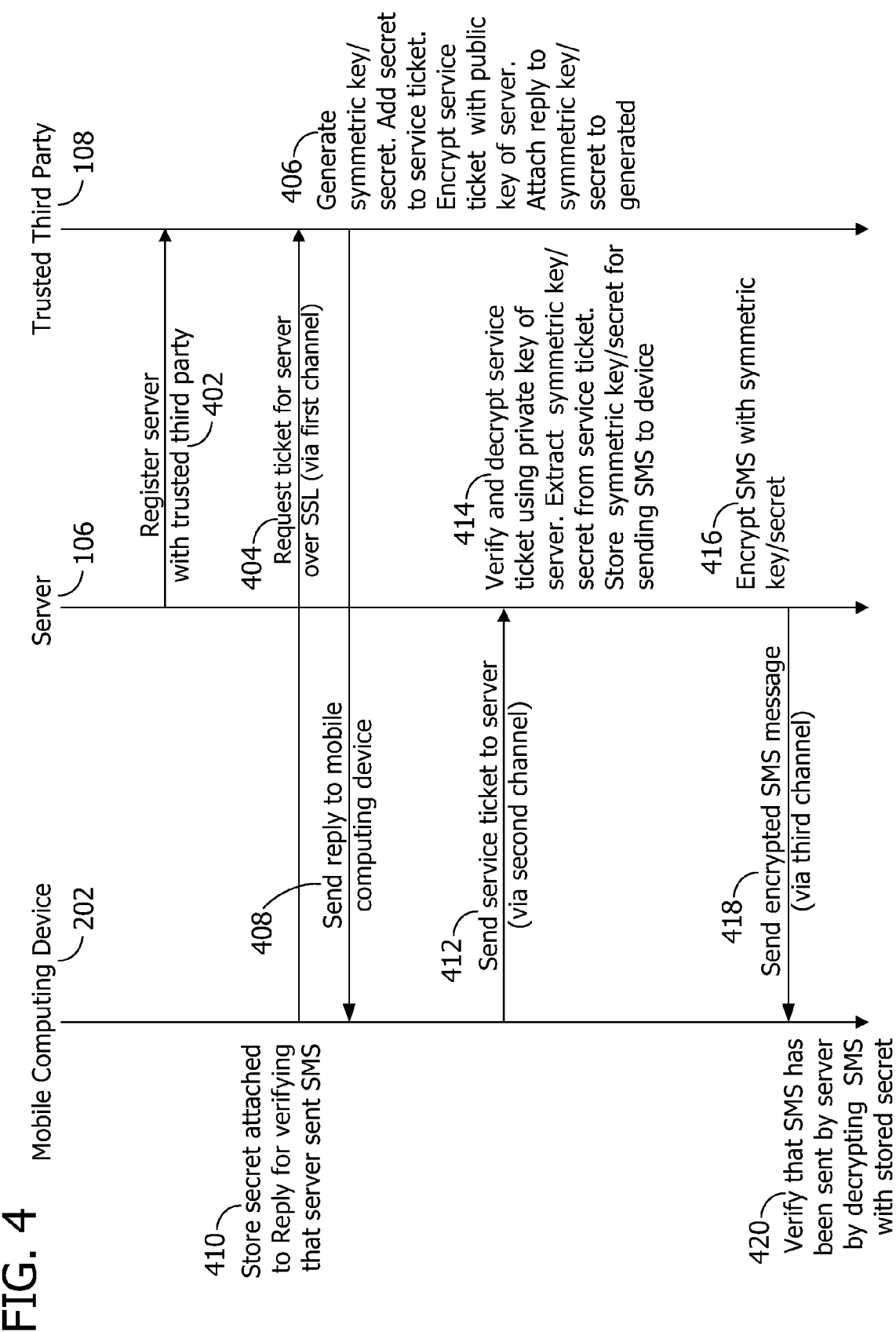
FIG. 4 is an exemplary sequence diagram illustrating a process for securing an SMS message sent from a server to a mobile computing device.

With reference now to FIG. 4, an exemplary implementation of the operations illustrated and provided herein is now described. At 402, the server 106 registers with the trusted third party 108 and a public key associated with the server 106 is provided to each of the server 106 and the trusted third party 108. At 404, the mobile computing device 202 requests a service ticket from the trusted third party 108 over a secure sockets layer (SSL). The mobile computing device 202 requests the service ticket using a pre-existing ticketing infrastructure, in some embodiments. At 406, the trusted third party 108 generates a symmetric key/shared secret. The trusted third party 108 adds the symmetric key/shared secret to the requested service ticket, encrypts the requested service ticket with the public key associated with the server 106, and attaches the symmetric key/shared secret to the requested service ticket. At 408, a reply that includes the requested service ticket and the symmetric key/shared secret attached to the requested service ticket is sent to the mobile computing device 202. At 410, the symmetric key/shared secret is stored in the mobile computing device 202. At 412, the requested service ticket is sent from the mobile computing device 202 to the server 106. At 414, the requested service ticket is verified and decrypted by the server 106 via a private key associated with the server 108 and corresponding to the public key. The server 108 then extracts the symmetric key/shared secret from the requested service ticket and stores the symmetric key/shared secret to, at 416, encrypt an SMS message with the symmetric key/shared secret. At 418, the encrypted SMS message is sent to the mobile computing device 202 from the server 106. At 420, to ensure that the server 106 sent the encrypted SMS message, the mobile computing device 202 verifies the encrypted SMS messaged by decrypting the encrypted SMS message with the symmetric key/shared secret.

Exemplary Operating Environment

A computer or computing device such as described herein has hardware including, for example, one or more processors or processing units, system memory, and some form of computer readable media. By way of example and not limitation, computer-readable media comprise computer storage media and communication media. Computer storage media include volatile and nonvolatile, removable and non-removable media implemented in any method or technology for storage of information such as computer readable instructions, data structures, program modules or other data. Exemplary computer storage media includes, but is not limited to, digital versatile disc (DVD), compact disc (CD), tape cassette, or floppy disk. Communication media typically embody computer readable instructions, data structures, program modules, or other data in a modulated data signal such as a carrier wave or other transport mechanism and include any information delivery media. Combinations of any of the above are also included within the scope of computer readable media.

The computer may operate in a networked environment using logical connections to one or more remote computers, such as a remote computer. Although described in connection with an exemplary computing system environment, embodiments of the disclosure are operational with numerous other general purpose or special purpose computing system environments or configurations. The computing system environment is not intended to suggest any limitation as to the scope of use or functionality of any aspect of the disclosure. Moreover, the computing system environment should not be interpreted as having any dependency or requirement relating to any one or combination of components illustrated in the exemplary operating environment. Examples of well known computing systems, environments, and/or configurations that may be suitable for use with aspects of the disclosure include, but are not limited to, personal computers, server computers, hand-held or laptop devices, multiprocessor systems, microprocessor-based systems, set top boxes, programmable consumer electronics, mobile telephones, network PCs, minicomputers, mainframe computers, distributed computing environments that include any of the above systems or devices, and the like.

Embodiments of the disclosure may be described in the general context of computer-executable instructions, such as program modules, executed as software by one or more computers or other devices. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other embodiments of the disclosure may include different computer-executable instructions or components having more or less functionality than illustrated and described herein. Aspects of the disclosure may also be practiced in distributed computing environments where tasks are performed by remote processing devices that are linked through a communications network. In a distributed computing environment, program modules may be located in both local and remote computer storage media including memory storage devices.

The embodiments illustrated and described herein as well as embodiments not specifically described herein but within the scope of aspects of the disclosure constitute exemplary means for securing a message sent from the server to the mobile computing device via an out-of-band channel, and exemplary means for obtaining the shared secret via a pre-existing ticketing infrastructure.

The order of execution or performance of the operations in embodiments of the disclosure illustrated and described herein is not essential, unless otherwise specified. That is, the operations may be performed in any order, unless otherwise specified, and embodiments of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the embodiments thereof, the articles "a," "an," "the," and "said" are intended to mean that there are one or more of the elements. The terms "comprising," "including," and "having" are intended to be inclusive and mean that there may be additional elements other than the listed elements.

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A system for securing a message from a server to a mobile computing device, the system comprising:
   a memory area for storing a shared secret; and
   a processor programmed to:
      request a service ticket from a trusted third party via a first channel;
      receive the service ticket and the shared secret from the trusted third party via the first channel;
      store the shared secret in the memory area;
      send the service ticket with the shared secret to the server via a second channel;
      receive an encrypted message from the server via a third channel that is out-of-band relative to the first channel and to the second channel, wherein the message is encrypted by the shared secret;
      decrypt, using the shared secret, the encrypted message, wherein the decrypted message include at least one command for execution on the mobile computing device; and
      process the command on the mobile computing device.

2. The system of claim 1, wherein the processor is further programmed to receive, from the server, the shared secret and the encrypted message.

3. The system of claim 2, wherein the processor is further programmed to request the service ticket from the trusted third party via a pre-existing ticketing infrastructure.

4. The system of claim 1, wherein the processor is further programmed to authenticate the mobile computing device to the trusted third party.

5. The system of claim 1, further comprising means for securing a message sent from the server to the mobile computing device via an out-of-band channel.

6. The system of claim 1, further comprising means for obtaining the shared secret via a pre-existing ticketing infrastructure.

7. The system of claim 1, wherein the command includes one or more of the following operations: reboot the mobile computing device, install/update software on the mobile computing device, lock the mobile computing device, unlock the mobile computing device, activate a particular feature associated with the mobile computing device, enable/disable features associated with the mobile computing device.

8. The system of claim 1, wherein a format of the encrypted message comprises: [Prefix] [EncodedData].

9. A method comprising:
   requesting, by a mobile computing device, a service ticket from a trusted third party via a first transmission control protocol (TCP) channel;
   obtaining the requested service ticket and a shared secret from the trusted third party via the first TCP channel;
   sending, by the mobile computing device, the service ticket with the shared secret to a server via a second TCP channel, the service ticket including an identifier of the mobile computing device;
   receiving, via a short message service (SMS) channel, an encrypted SMS message from the server, wherein the server encrypted the SMS message via the shared secret;
   decrypting the encrypted SMS message via the shared secret; and
   providing the decrypted SMS message to a user of the mobile computing device.

10. The method of claim 9, wherein the encrypted SMS message is not larger than 160 characters.

11. The method of claim 9, further comprising obtaining the shared secret and the encrypted SMS message from the server.

12. The method of claim 11, further comprising authenticating the mobile computing device to the trusted third party.

13. The method of claim 12, wherein requesting the service ticket from the trusted third party via the first TCP channel comprises requesting the service ticket from the trusted third party via the first TCP channel in a pre-existing ticketing infrastructure.

14. The method of claim 9, wherein the server receives the shared secret from the trusted third party after a request for the service ticket is made, and wherein the server compares the shared secret received with the service ticket with the shared secret received from the trusted third party.

15. One or more computer storage devices storing computer-executable components, said components comprising:
   an interface component that when executed by at least one processor causes the at least one processor to send a service ticket request to a trusted third party, to receive from the trusted third party the requested service ticket with a shared secret via a first channel, and to send the service ticket and the shared secret to a server via a second channel;
   a memory component that when executed by at least one processor causes the at least one processor to store the shared secret and to store an encrypted short messaging service (SMS) message received from a server via a third channel that is out-of-band relative to the first channel and to the second channel; and
   a decryption component that when executed by at least one processor causes the at least one processor to decrypt the encrypted SMS message via the shared secret.

16. The computer storage device of claim 15, wherein the first channel and the second channel are separate transmission control (TCP) channels.

17. The computer storage device of claim 15, wherein the encrypted SMS message comprises confidential information regarding the service ticket.

18. The computer storage device of claim 15, wherein the encrypted SMS message is not larger than 160 characters.

19. The computer storage device of claim 15, wherein the server receives the shared secret from the trusted third party upon the request of the service ticket.

20. The computer storage device of claim 15, wherein the encrypted SMS message is encrypted by the server via the shared secret.

* * * * *